(12) United States Patent
Sinclair et al.

(10) Patent No.: US 7,657,377 B2
(45) Date of Patent: Feb. 2, 2010

(54) AZIMUTHAL MEASUREMENT-WHILE-DRILLING (MWD) TOOL

(75) Inventors: Paul L. Sinclair, Austin, TX (US);
Thomas A. Springer, Austin, TX (US)

(73) Assignee: CBG Corporation, Austin, TX (US)

( * ) Notice: Subject to any disclaimer, the term of this patent is extended or adjusted under 35 U.S.C. 154(b) by 0 days.

(21) Appl. No.: 11/756,504

(22) Filed: May 31, 2007

(65) Prior Publication Data

US 2008/0300791 A1     Dec. 4, 2008

(51) Int. Cl.
*G01V 1/40*     (2006.01)
(52) U.S. Cl. .................. 702/7; 702/9; 702/11; 702/13; 324/338; 324/366
(58) Field of Classification Search ............... 702/7, 702/9, 11, 13, 150–152; 324/369, 366, 338, 324/343
See application file for complete search history.

(56) References Cited

U.S. PATENT DOCUMENTS

| | | | |
|---|---|---|---|
| 5,508,616 A | 4/1996 | Sato et al. | 324/343 |
| 6,064,210 A | 5/2000 | Sinclair | 324/369 |
| 6,594,584 B1 | 7/2003 | Omeragic et al. | 702/9 |
| 2005/0140373 A1 | 6/2005 | Li et al. | 324/338 |
| 2005/0278122 A1 | 12/2005 | Tabarovsky et al. | 206/514 |
| 2007/0027629 A1 | 2/2007 | Hassan et al. | 702/11 |

OTHER PUBLICATIONS

Allan et al., "Design, Development and Field Introduction of a Unique Low-Frequency (20KHZ) Induction Resistivity Logging-While-Drilling Tool," SPWLA 45th Annual Logging Symposium, Jun. 6-9, 2004, Copyright 2004 held jointly by the Society of Petrophysicists and Well Log Analysts (SWPLA) and the submitting authors, pp. 1-14.
CBG Corporation, "Logging Tools for Oil Exploration, *Geosteering Resistivity Tool*," Jun. 2006, 4 pages, www.cbgcorp.com.

*Primary Examiner*—Drew A Dunn
*Assistant Examiner*—Hien X Vo
(74) *Attorney, Agent, or Firm*—Campbell Stephenson LLP; Brenna A. Brook

(57) ABSTRACT

Various systems and methods determine a distance, magnitude, and azimuthal angle describing the location of an anomaly within a geologic formation. For example, a method involves identifying an electrical characteristic (e.g., resistivity or conductivity) at each of several sensors in a measurement-while-drilling (MWD) tool. Based on the electrical characteristic, information identifying a formation property of the anomaly is generated. The information includes at least one magnitude and at least one distance. Information information identifying an azimuthal angle is also generated based upon the electrical characteristic. The azimuthal angle relates a position of the anomalous formation to a position of a first sensor in the MWD tool.

37 Claims, 9 Drawing Sheets

AZIMUTHAL MEASUREMENT-WHILE-DRILLING (MWD) TOOL

FIELD OF THE INVENTION

This invention relates to the field of measurement-while-drilling (MWD) logging, particularly for oil and gas development and exploration.

DESCRIPTION OF THE RELATED ART

Logging is a technique that is used to measure one or more characteristics, such as resistivity, of subsurface geologic formations. Such a measurement can be used, for example, to determine the type of subsurface formation surrounding a drill bit. Accordingly, logging provides useful information to engineers and geologists engaged in hydrocarbon exploration and production and similar fields, such as mining.

Logging can be performed by inducing a current to flow in a formation and then selectively measuring the current distribution. Several different techniques for performing logging have been developed. For example, open-hole logging involves in removing the drill pipe and bit from a wellbore and then lowering an open-hole logging tool into the wellbore to obtain the desired measurements.

Measurement-while-drilling (MWD, also known as logging-while-drilling) systems have also been developed. These MWD systems differ from open-hole logging in that measurements can be obtained while the drill pipe is in the wellbore. MWD systems permit log information, such as resistivity, to be measured in a formation very soon after the formation is penetrated by the drill bit. This provides substantially "real-time" information that (a) is obtained before the formation is substantially altered by inflow of drilling fluids or other factors and (b) may be used by the driller to control the drilling operation, for example by steering the bit so as to penetrate (or so as not to penetrate) a selected formation detected by the MWD system. MWD systems typically include transmitters and sensors disposed in or on sections of drill pipe that are located near the drill bit.

Some existing MWD systems have developed techniques to determine whether the drill bit is approaching an anomaly within a formation. However, these techniques generally lack the ability to pinpoint the location of the anomaly relative to the drill bit. Such techniques also lack the ability to distinguish between a more conductive anomaly on one side of the drill bit and a less conductive anomaly on the other side of the drill bit. Accordingly, improved techniques for use in MWD systems are desirable.

SUMMARY OF THE INVENTION

Various systems and methods for determining a distance, magnitude, and azimuthal angle describing the location of an anomaly within a geologic formation are disclosed. In one embodiment, a method involves identifying an electrical characteristic (e.g., resistivity or conductivity) at each of several sensors in a measurement-while-drilling (MWD) tool. Based on the electrical characteristic, information identifying a formation property of the anomaly is generated. The information includes at least one magnitude and at least one distance. Information identifying an azimuthal angle is also generated based upon the electrical characteristic. The azimuthal angle relates a position of the anomalous formation to a position of a first sensor in the MWD tool. The azimuthal angle can be used to calculate a relative angle that relates the position of the anomaly to a known direction (e.g., magnetic north or the gravity vector).

In embodiments in which the electrical characteristic is conductivity, the information can be generated by calculating a ratio of a near current to a far current. The near current is received by the sensor closest to the anomaly, while the far current is received by the furthest sensor from the anomaly. The magnitude and distance can then be obtained from a lookup table, based upon the calculated ratio.

The method can also involve determining whether the anomaly is more conductive or less conductive than the surrounding geologic formation. This determination can be made based upon information that indicates the historical conductivity detected by the MWD tool in the formation. Alternatively, this determination can involve identifying which of the sensors is receiving a greatest or smallest amount of current.

If the anomaly is more conductive than the geologic formation, the azimuthal angle can be identified by generating a conductivity value for each of the sensors, computing a first difference between conductivity values associated with a first pair of sensors on opposing sides of the MWD tool, computing a second difference between conductivity values associated with a second pair of sensors on opposing sides of the MWD tool, and then calculating the arctangent of the ratio of the first difference to the second difference.

If instead the anomaly is less conductive than the geologic formation, the azimuthal angle can be identified by generating a resistivity value for each of the sensors, computing a first difference between resistivity values associated with a first pair of sensors on opposing sides of the MWD tool, computing a second difference between resistivity values associated with a second pair of sensors on opposing sides of the MWD tool; and then calculating an arctangent of a ratio of the first difference to the second difference.

A graphical display can be generated from the information. For example, a graphic that is based upon the magnitude, distance, and azimuthal angle can be generated and displayed on a polar display. The center of the polar display corresponds to the location of the borehole in which the MWD tool is located, and thus the graphic shows the position of the anomaly (or a set of possible positions of the anomaly) relative to the borehole. In one embodiment, the graphic comprises one or more regions. Each region represents a portion of the geologic formation having a different conductivity and corresponds to a respective one of one or more magnitude and distance pairs that are included in the information (each magnitude and distance pair corresponds to a respective possible conductivity of the anomaly).

One or more bands (each corresponding to a respective possible conductivity of the anomaly) can be displayed on the polar display. The boundary between bands can be determined by identifying a tangent line based upon the azimuthal angle. The tangent line intersects a circle having a radius equal to one of the distances. A band, which is bounded by the tangent line, can then be marked on the polar display.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
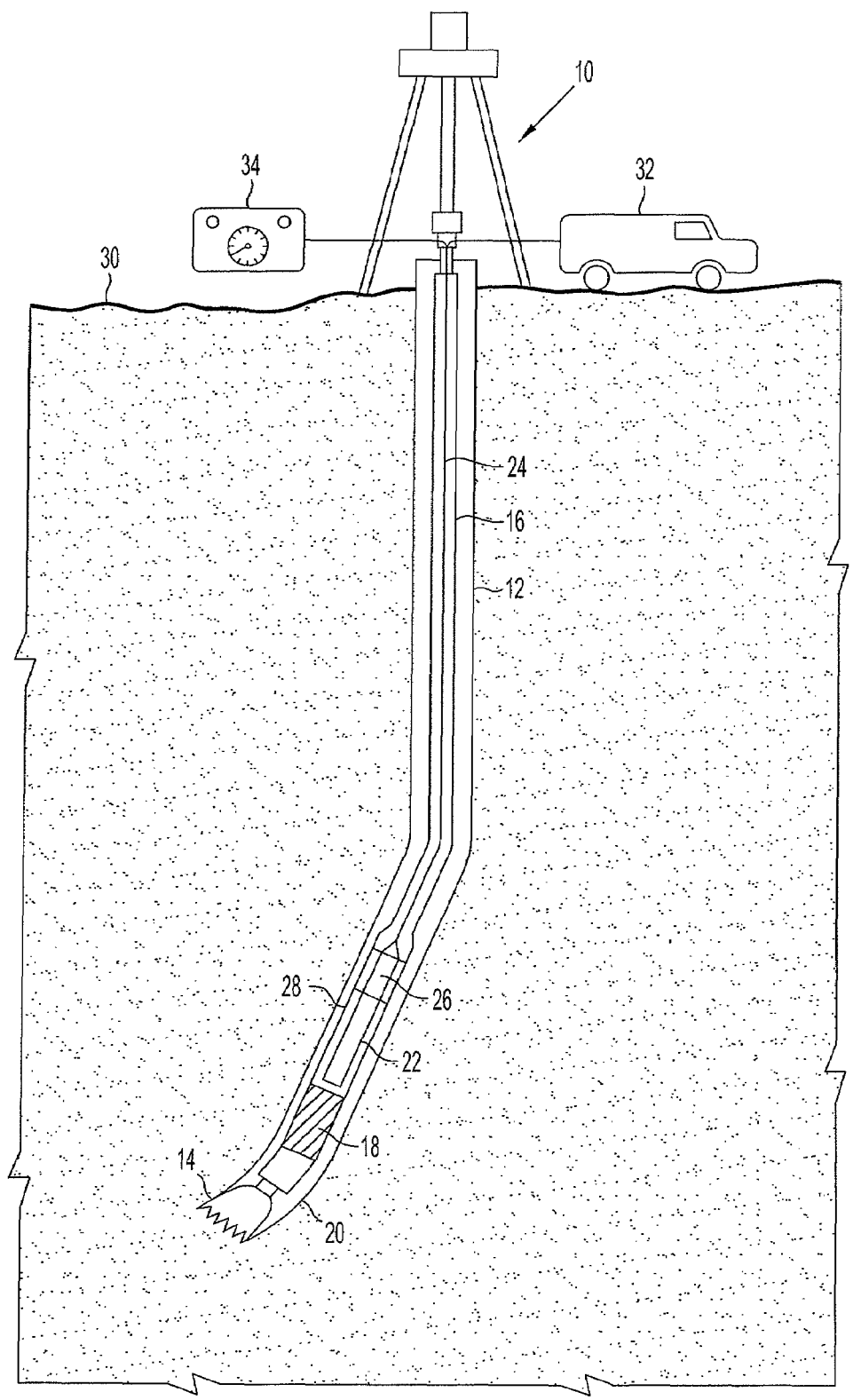
FIG. 1 illustrates a drilling system in which embodiments of the present invention can be employed.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 illustrates how a drilling operation employs drilling rig 10 to cut a borehole 12 into the earth, penetrating the subsurface geological formation. Drillstring 16 passes through borehole 12 and is coupled between drilling rig 10 and a drill bit 14. Drillstring 16 includes drill bit 14, collars 28, and drill pipe.

The lowest part of drillstring 16 is made up of collars 28. Collars 28 are heavy walled pipe that provide weight on drill bit 14 and strength to resist buckling under their own weight. The drill pipe is thinner walled. The drill pipe is kept in tension (which may be effected by collars 28 placing weight on drill bit 14) to prevent buckling. Collars 28 may have radial projections (not shown) called stabilizers. Short drill collars, which may be adapted for specialized functions, are called "subs," and references herein to drill collars are intended to include subs.

Drilling rig 10 turns drill bit 14, which cuts through the rock at the bottom of borehole 12. In some situations, drilling rig 10 turns drill bit 14 by attaching drill bit 14 to the lower end of drillstring 16 and turning drillstring 16 with powered equipment at the surface. Alternatively, as shown in FIG. 1, drill bit 14 may be driven by a motor 18, which is adjacent to drill bit 14 in borehole 12, through bent sub 20. The illustrated arrangement is known as a "steering tool" system, in which drillstring 16 does not need to rotate to turn the drill bit. However, drillstring 16 can be turned to steer drill bit 14, so as to control the direction of advance of borehole 12, thus permitting the route of borehole 12 to be precisely steered as desired through the subsurface geologic formation.

A measurement-while-drilling (MWD) tool 22 is placed in drillstring 16 as close as possible to drill bit 14. In a steered system, the MWD tool may be placed above mud motor 18, such that MWD tool 22 receives power and returns data to the surface through a wire line cable 24 that is passed down the center of a non-rotating (or slowly rotating) drillstring 16. In a system that uses a rotating drillstring 16 to turn drill bit 14, MWD tool 22 may be placed just above drill bit 14, and a mud pulse data telemetry system (or any other appropriate telemetry method) can be used to return information to the surface. Thus, MWD tool 22 is operatively positioned in borehole 12, typically with an annular space (e.g., filled with drilling mud) between tool 22 and the borehole wall.

MWD tool 22 can incorporate or be associated with directional sensors 26 that provide directional information to the driller to assist in controlling the steering of the drill bit. For example, such directional sensors can be calibrated to indicate the position of the MWD tool 22 relative to an absolute direction, such as the gravity vector or magnetic north. MWD tool 22 also includes several electrical sensors that are each configured to detect an electrical characteristic, such as an amount of current flowing through the subsurface geologic formation, as well as one or more transmitters that are configured to generate an electrical current.

In operation, MWD tool 22 generates an electrical survey current. This current passes through the surrounding subsurface geologic formation and is received by the electrical sensors included within MWD tool 22. The portion of the current that is received by each sensor is sensed and quantified by electronics within MWD tool 22. The amount of received current has an inverse relationship to the formation's resistivity in proximity to the receiving sensor. Thus, the quantified received current information can be converted to information that identifies the resistivity (or conductivity, which is simply the inverse of resistivity) of the proximate portion of the formation. MWD tool 22 can also include or be coupled to telemetry or other communication equipment to transmit this information to the earth's surface.

Above the earth's surface 30, telemetry receivers and/or other appropriate communication equipment can be located in a logging truck 32 located near drilling rig 10. Thus, communication equipment is positioned to receive and interpret the information generated by MWD tool 22 and directional sensors 26, so that the information can be collected for later analysis and/or used to steer wellbore 12 into the desired position (e.g., to maximize recovery of hydrocarbons from a selected reservoir).

A data display panel 34 can be provided on or near drilling rig 10 and/or logging truck to give an operator (e.g., a driller, engineer, geologist, or the like) real-time information about the directional progress of wellbore 12 As well as the formation properties of the geologic formation currently near MWD tool 22. In one embodiment, data display panel 34 can be part of a computing device (e.g., data display panel 34 can be rendered on the screen of a laptop computer used by an operator of drilling rig 10). Data display panel 34 can provide a polar display indicating formation properties of an anomaly within the geologic formation, as described in more detail below with respect to FIGS. 3 and 5.

Figure 2:
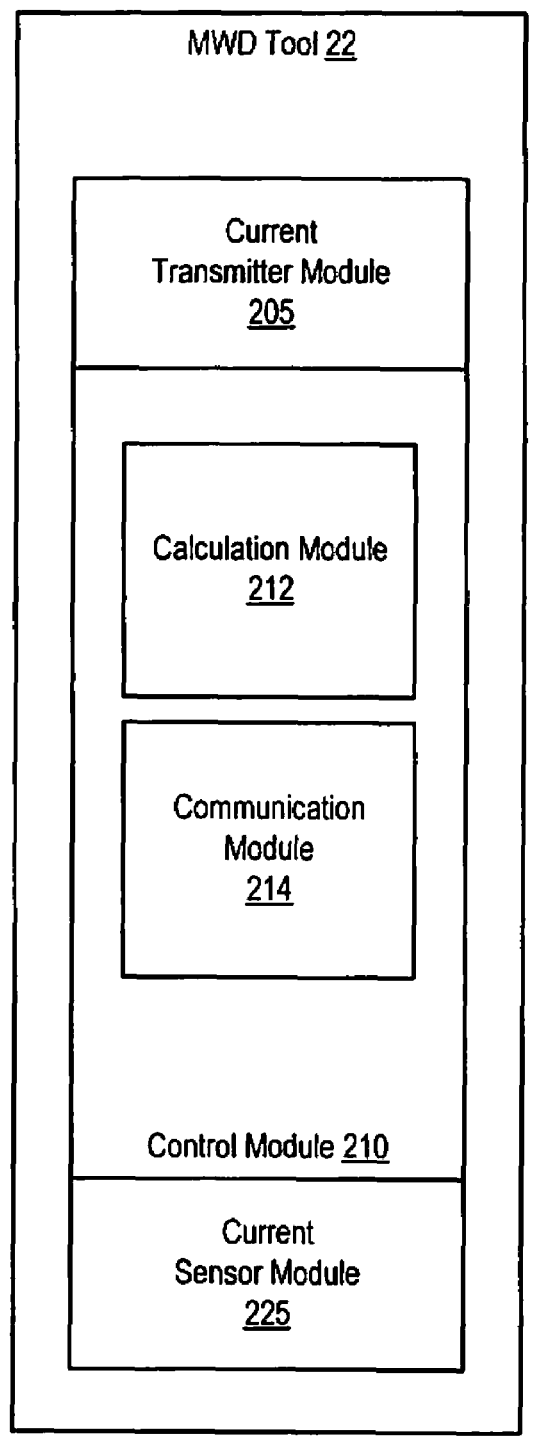
FIG. 2 is a block diagram illustrating the functionality included in a MWD tool, according to one embodiment of the present invention.

FIG. 2 is a block diagram of MWD tool 22. As shown, MWD tool 22 includes a current transmitter module 205, a control module 210, and a current sensor module 225. MWD tool 22 can be implemented as a sub (e.g., a drill collar) for use as part of a drillstring, as described above. In one embodiment, the structural features and physical components of MWD tool 22 are similar to those described in U.S. Pat. No. 6,064,210, which issued on May 16, 2000 and names Paul L. Sinclair as inventor, and which is hereby incorporated by reference as if completely and fully set forth herein.

Current transmitter module 205 is configured to cause a current to be injected into the subsurface geologic formation surrounding a borehole in which MWD tool 22 is inserted. In one embodiment, current transmitter module is electrically and/or mechanically coupled to one or more transmitters (not shown) on the outside of MWD tool 22 by one or more contacts (e.g., spring actuated contacts).

Current transmitter module 205 can include an oscillator (e.g., configured to produce a sinusoidal wave at a frequency in the range 100 Hz-10 KHz) as well as an associated power amplifier configured to boost the signal level of the output from the oscillator. In one embodiment, the oscillator is a digital sine wave synthesizer that also generates a synchronous square wave control signal for a phase sensitive detector included in current sensor module 225.

Current sensor module 225 is configured to quantify an amount of current received by (or another electrical characteristic detected at) each of several sensors disposed on the outside of the MWD tool. Like current transmitter module 205, current sensor module 225 can be electrically and/or mechanically coupled to each of several sensors by a contact (e.g., a spring actuated contact). Current transmitter module 205 and current sensor module 225, as well as their respective sensors, transmitter(s), and contacts, can be electrically insulated from each other.

Current transmitter module 205 and/or current sensor module 225 can also include a sensor to detect a formation voltage. For example, in one embodiment, current transmitter module 205 includes an external sensor coupled to internal circuitry for determining the formation voltage. The voltage sensor can be a monitor electrode that is electrically insulated from the transmitter that injects current into the formation. Information representing the magnitude of the formation voltage can be provided to control module 210.

As noted above, current transmitter module 205 is configured to inject current into the formation surrounding MWD tool 22 via one or more transmitters. The return path of the current passes through the sensors coupled to current sensor module 225. Based upon the proportion of the amount of current injected by current transmitter module 205 relative to the amount of current received by each sensor coupled to current sensor module 225, a calculation module 212 within control module 210 can calculate various formation characteristics, as described in more detail below.

In the illustrated example, control module 210 includes calculation module 212 and communication module 214. Control module 210 is configured to receive information from current transmitter module 205 that indicates the amount of current injected into the surrounding formation. Control module 210 also receives information from current sensor module 225 that indicates the amount of current received by each of several sensors.

Based on the information received by control module 210, calculation module 212 can process the received information to calculate one or more values. In particular, based upon the information received from current sensor module 225, calculation module 212 can determine whether the drill bit is approaching an anomaly within the formation and, if so, calculate an azimuthal angle describing the location of the anomaly as well as a magnitude of a characteristic (e.g., conductivity or resistivity) of the anomaly and a distance to the anomaly. More details regarding the types of calculations that can be performed by calculation module 212 are provided below in the discussions of FIG. 3.

Communication module 214 is configured to communicate information received by control module 210 and/or calculated by calculation module 212 to another sub or to a surface system. Communication module 214 can be configured to interface to and/or communicate via a wire line cable (e.g., wire line cable 24 of FIG. 1), a telemetry system, or any other desired communication system and/or communication media.

In one embodiment, control module 210 (or a combination of control module 210 and current transmitter module 205 and/or current sensor module 225) is implemented as an inner cartridge that includes all of the active components of MWD tool 22, including electronic circuits, communication circuits, directional sensors, and the like. In some embodiments, this inner cartridge is retrievable, such that the inner cartridge can be installed and/or withdrawn from MWD tool 22 while MWD tool 22 is below the surface. For example, the inner cartridge can be installed or withdrawn through the drillstring using a slick line cable or wireline attached to the upper end of the MWD tool. The drillstring can include a muleshoe (not shown) to accept and orient the inner cartridge in such an embodiment.

While certain components are shown as part of MWD tool in FIG. 2, it is noted that in alternative embodiments, such components can be implemented within other subs within the drillstring and/or other components within the drilling system. For example, the communication module 214 and/or directional sensors (not shown) can each be implemented within another sub. Similarly, all or part of the functionality of control module 210 can be implemented within another sub or within a surface computing device.

Figure 2A:
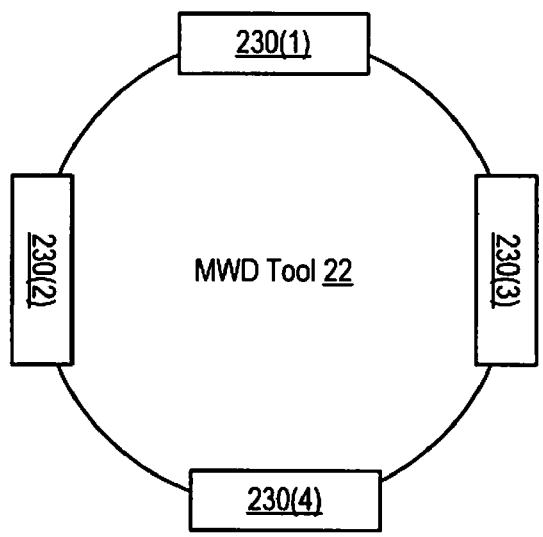
FIG. 2A is a cross-sectional view of the MWD tool, illustrating an example sensor arrangement, according to one embodiment of the present invention.

FIG. 2A illustrates a cross-sectional view of MWD tool 22 (e.g., this cross section can pass through the section of the MWD tool that includes current sensor module 225). This view illustrates how sensors 230(1)-230(4) can be disposed around the outside of MWD tool 22. These sensors can be electrically and/or mechanically coupled to a sensor module within the MWD tool. Sensors can include electrodes, magnetic elements, or any other suitable device for detecting a current flowing in (or other electrical characteristic of) a formation surrounding the MWD tool.

In the example of FIG. 2A, four sensors 230(1)-230(4) are used. These sensors are arranged in pairs, such that within a given pair, the sensors are directly opposite of each other. For example, sensor 230(2) is opposite sensor 230(3) (forming one pair of sensors), and sensor 230(1) is similarly opposite sensor 230(4) (forming another pair). Furthermore, the sensors are evenly spaced around the outside of MWD tool 22, such that the sensors are each located 90 degrees apart on the circumference of the MWD tool 22.

It is noted that other sensor arrangements can be used in other embodiments. For example, instead of having the sensors be evenly spaced, some sensors can be slightly closer to others (e.g., instead of having sensors at 0°, 90°, 180°, and 270°, sensors can be located at 0°, 95°, 180°, and 275°. Such an arrangement can still allow sensors within a given pair of sensors to be located directly opposite from each other, if desired.

As yet another alternative, some sensors may be located in different planes than other sensors. For example, while the example of FIG. 2A shows all sensors as being located in the same cross-sectional plane of the MWD tool, other embodiments can arrange sensors so that some sensors are located in a plane somewhat (e.g., a few millimeters) above or below (e.g., relative to the location of the end of the MWD tool closest to the drill bit) the other sensors.

Furthermore, it is noted that other embodiments can include differing numbers of sensors. For example, one alternative embodiment can include six sensors around the circumference of MWD tool 22. Another alternative embodiment can include eight sensors. These sensors can be evenly spaced around the periphery of MWD tool 22, or the spacing can be varied as described above.

Figure 2B:
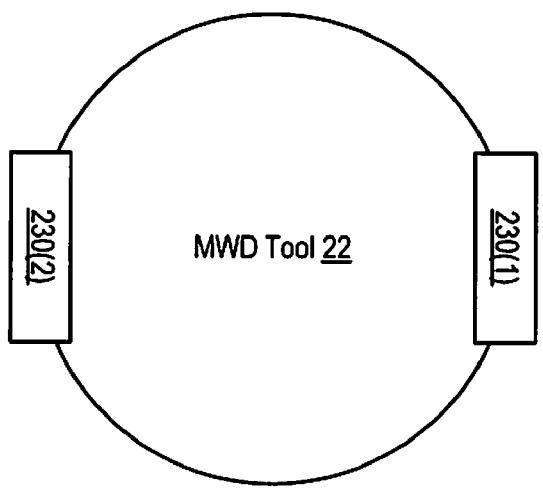
FIG. 2B is a cross-sectional view of the MWD tool, illustrating another sensor arrangement, according to one embodiment of the present invention.

FIG. 2B is another cross-sectional view of MWD tool 22 illustrating another sensor arrangement. In this arrangement, only two sensors 230(1) and 230(2) are disposed around the outside of MWD tool 22. In the illustrated example, the two sensors are located directly across from each other in the same plane. However, as described above, this arrangement can be varied (e.g., by placing the sensors in different planes or by moving one sensor so that the sensors are no longer exactly opposite each other).

In embodiments such as the one shown in FIG. 2B, the MWD tool 22 can be configured to take multiple measurements, and to be rotated between each measurement in a series of measurements. For example, in order to obtain equivalent measurements to a MWD tool having four pairs of sensors, the MWD tool shown in FIG. 2B can take four measurements. Between each measurement, the MWD tool is rotated by 90 degrees. To take the equivalent measurements to a MWD tool having two pairs of sensors, the MWD tool can take two measurements while being rotated 180 degrees between each measurement. Similarly, a MWD tool having three sensors can be rotated one or more times to take measurements equivalent to those generated by a MWD tool having six, nine, or more sensors. In general, depending upon the number "n" of measurements desired, the MWD tool can be rotated approximately 360/n degrees between each measurement.

In some embodiments, the MWD tool is configured to provide measurements at a fixed rate (e.g., one measurement every five minutes). In such embodiments, the MWD tool can be slowly rotated throughout the measurement process, such that the MWD tool is rotated the desired number of degrees between successive measurements. Thus, measurements can be taken while the MWD tool is slowly rotating (as opposed to being taken while the MWD is in a fixed, non-rotating position).

Figure 3:
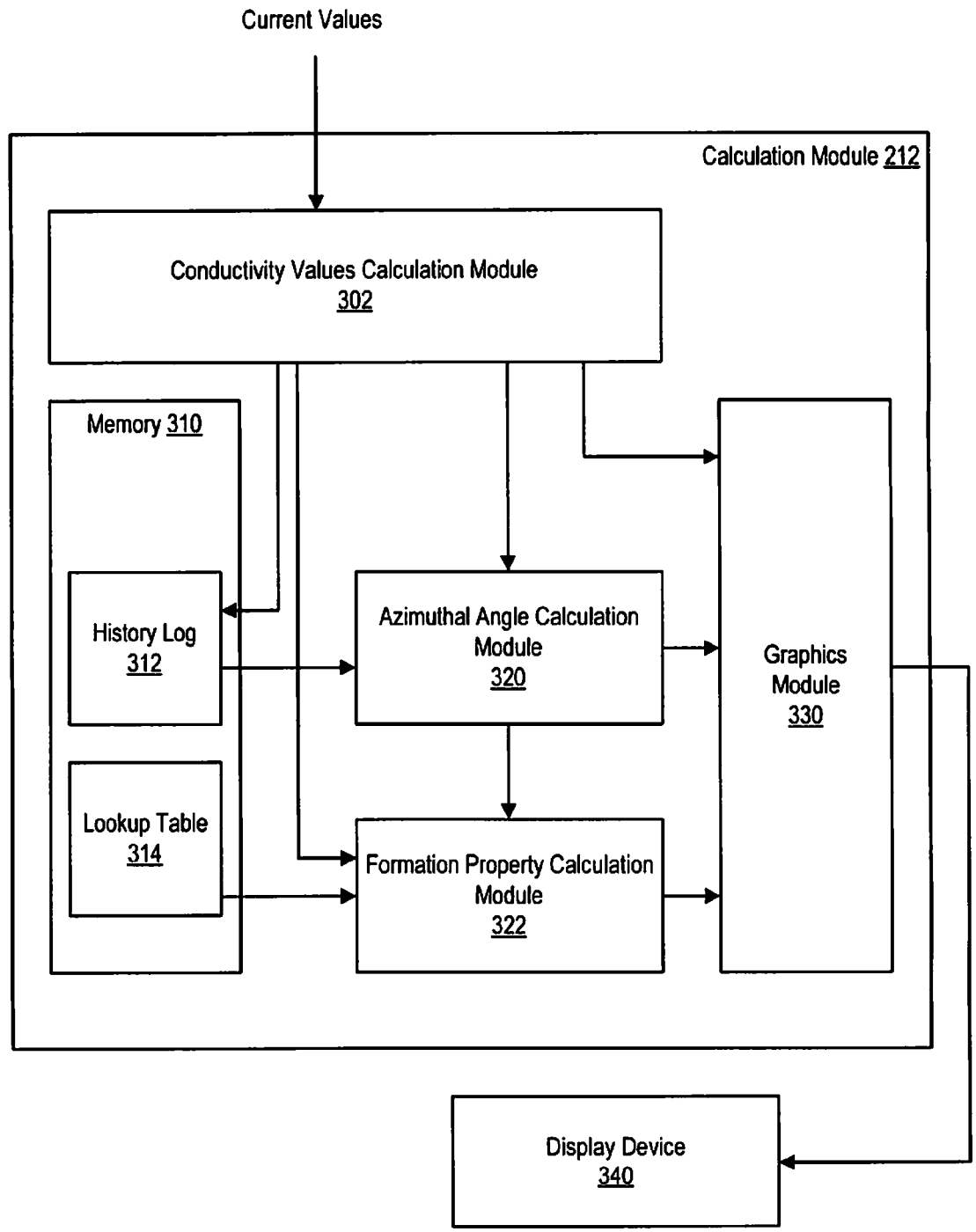
FIG. 3 is a block diagram of functionality included within and/or coupled to the MWD tool, according to one embodiment of the present invention.

FIG. 3 is a block diagram of functionality included within and/or coupled to the MWD tool. In particular, FIG. 3 illustrates an example of the functionality that can be included within a calculation module 212 of a MWD tool.

As shown, calculation module 212 includes conductivity values calculation module 302, memory 310, azimuthal angle calculation module 320, formation property calculation module 322, and graphics module 330. Calculation module 212 is also coupled (e.g., via communication module 214 of FIG. 2) to a display device 340. It is noted that display device 340 is likely to be located on the surface, where display device 340 can be viewed by an operator.

Conductivity values calculation module 302 is configured to receive current values from current transmitter module 205 and/or current sensor module 225 of FIG. 2. These values represent the amount of current injected into the formation (as received from current transmitter module 205) and the amount of current returned to each of several sensors (as received from current sensor module 225). It is noted that in some embodiments, current transmitter module 205 always transmits the same amount of current, and thus a constant value representing that amount of current can be provided to conductivity values calculation module when the MWD tool is being configured, instead of having the current transmitter module dynamically provide such a value to calculation module 212 during operation.

Conductivity values calculation module 302 can also receive one or more voltage values (not shown) that represent the formation voltage (e.g., the formation voltage can be the voltage detected between current transmitter module 205 and current sensor module 225). Such voltage value(s) can be received from current transmitter module 205 of FIG. 2

Conductivity values calculation module 302 can be configured to correct the received current values in order to account for any errors introduced by the measurement process. For example, current values can be corrected for any offset errors. The offset errors, if any, can be detected and quantified by switching calibrated signals in the inputs of the measurement circuits. The voltage value, which represents the formation voltage, can similarly be corrected for any errors.

Once conductivity values calculation module 302 has received and, if desired, corrected the received current and voltage values, conductivity values calculation module 302 can calculate the individual apparent conductivity for each sensor, as well as a background conductivity. To calculate the individual apparent conductivity values, each individual current value is divided by the formation voltage value and multiplied by a tool constant.

For example, if there are four sensors in the MWD tool, calculation module 212 receives four individual current values $I_{A1}$, $I_{A2}$, $I_{A3}$, and $I_{A4}$, which represent the current received by respective sensors A1, A2, A3, and A4, from current sensor module 225. In this example configuration, which will be referred to throughout the discussion of FIG. 3, sensors A1 and A3 form one pair and sensors A2 and A4 form another pair. Sensors in the same pair are located substantially opposite from each other (e.g., similar to the arrangement shown in FIG. 2A). Conductivity values calculation module 302 can then process these values to obtain a set of four apparent conductivity values: $\sigma_{A1}$, $\sigma_{A2}$, $\sigma_{A3}$, and $\sigma_{A4}$. Each apparent conductivity value is related to a corresponding sensor (e.g., $\sigma_{A1}$ relates to sensor A1, $\sigma_{A2}$ relates to sensor A2, and so on). It is noted that conductivity values calculation module 302 can alternatively (or additionally) calculate apparent resistivity values, which will simply be the inverse of the apparent conductivity values described herein.

Conductivity values calculation module 302 then calculates the background conductivity, $\sigma_{AB}$. If all of the sensors are receiving substantially the same amount of current, conductivity values calculation module 302 can calculate the background conductivity by averaging the apparent conductivity values. For example, in the situation in which there are four sensors, and thus four apparent conductivity values, the background conductivity can be calculated as:

$$\sigma_{AB} = \frac{\sigma_{A1} + \sigma_{A2} + \sigma_{A3} + \sigma_{A4}}{4}$$

If some of the sensors are receiving different amounts of current, it indicates that the drill bit may be approaching an anomaly. In this situation, conductivity values calculation module 302 can use the most-recently calculated background conductivity as the current background conductivity, instead of calculating a new average.

After calculating the apparent conductivity values $\sigma_{A1}$-$\sigma_{AN}$ (where N is the number of sensors) and the background conductivity $\sigma_{AB}$, conductivity values calculation module 302 can provide these values to one or more other modules within calculation module 212. For example, conductivity values calculation module 302 can write these values to memory 310 as part of history log 312.

In general, at any given time, history log 312 stores one or more sets of apparent conductivities (and/or resistivities) and/or one or more background conductivities (and/or resistivities) that have been previously calculated by conductivity values calculation module 302. History log 312 can be configured to store a maximum number of such sets of values (e.g., history log 312 can be implemented as a circular queue, such that once history log 312 is full, the newest entry to history log 312 will be written over the oldest entry stored in history log 312).

Conductivity values calculation module 302 can also provide the apparent conductivity values to azimuthal angle calculation module 320. Azimuthal angle calculation module 320 is configured to calculate an azimuthal angle, $\theta_A$, from the apparent conductivity values. The azimuthal angle describes the location of an anomaly within a geographic formation (such an anomaly can be a parallel bed of rock that has different electrical characteristics than the rock formation currently being encountered by the drill bit) relative to a known point on the MWD tool. The azimuthal angle is used to define a vector that is perpendicular to the surface of the MWD tool and that describes the direction in which the anomaly is focused.

Azimuthal angle calculation module 320 makes determinations as to whether (1) the apparent conductivities indicate that the MWD tool is approaching an anomaly within the formation and (2) if so, whether the anomaly is more or less conductive than the surrounding formation. Based on these determinations, azimuthal angle calculation module 320 can then calculate the azimuthal angle $\theta_A$ that describes the location of the anomaly relative to a known point (e.g., a prespecified one of the sensors) on the MWD tool. Azimuthal angle calculation module 320 is configured to calculate $\theta_A$ by computing the arctangent of the ratio of the differences between the apparent conductivities (or resistivities) detected at sensors in the same pair of sensors. As noted above, sensors within the same pair are typically located on substantially opposite sides of the MWD tool.

To determine whether the MWD tool (and thus the drill bet to which the MWD tool is attached) is approaching an anomaly, azimuthal angle calculation module 320 can perform one or more comparisons. For example, azimuthal angle calculation module 320 can compare the individual apparent conductivity values. If the values differ from each other, it can be an indication that the formation is not uniform. Alternatively (or additionally), azimuthal angle calculation module 320 can compare the most recently received set of apparent conductivities (or resistivities) to historical apparent conductivity values stored in history log 312. If differences exist, it can indicate that the MWD tool is approaching an anomaly within the formation. If the apparent conductivities (or resistivities) indicate that no anomaly is present, azimuthal angle calculation module 320 does not need to calculate the azimuthal angle.

If an anomaly is present, azimuthal angle calculation module 320 then determines whether the anomaly is more or less conductive than the surrounding formation. This determination can be based on a comparison of the most recently received set of apparent conductivities with one or more historical conductivities stored in history log 312. If any of the apparent conductivities have increased relative to the historical conductivities, azimuthal angle calculation module 320 can determine that the MWD tool is approaching a more conductive anomaly. Similarly, if any of the apparent conductivities have decreased relative to the historical conductivities, azimuthal angle calculation module 320 can determine that the MWD tool is approaching a less conductive anomaly. It is noted that similar determinations can be made using resistivity instead of conductivity.

As an alternative to using history log 312, azimuthal angle calculation module 320 can attempt to determine whether the anomaly is more or less conductive based solely on the relative amount of current currently being detected by each sensor. For example, in embodiments configured with four sensors A1-A4, azimuthal angle calculation module 320 (or another module, such as conductivity values calculation module 302) can identify the sensor $A_{min}$ that is receiving the least amount of current and the sensor $A_{max}$ that is receiving the greatest amount of current. If the anomaly is more conductive than the formation, then $A_{min}$ is the nearest sensor and $A_{max}$ is the furthest sensor, while if the anomaly is more resistive than the formation, $A_{max}$ is the furthest sensor and $A_{min}$ is the nearest sensor. An example of this situation is illustrated in FIG. 4.

Figure 4:
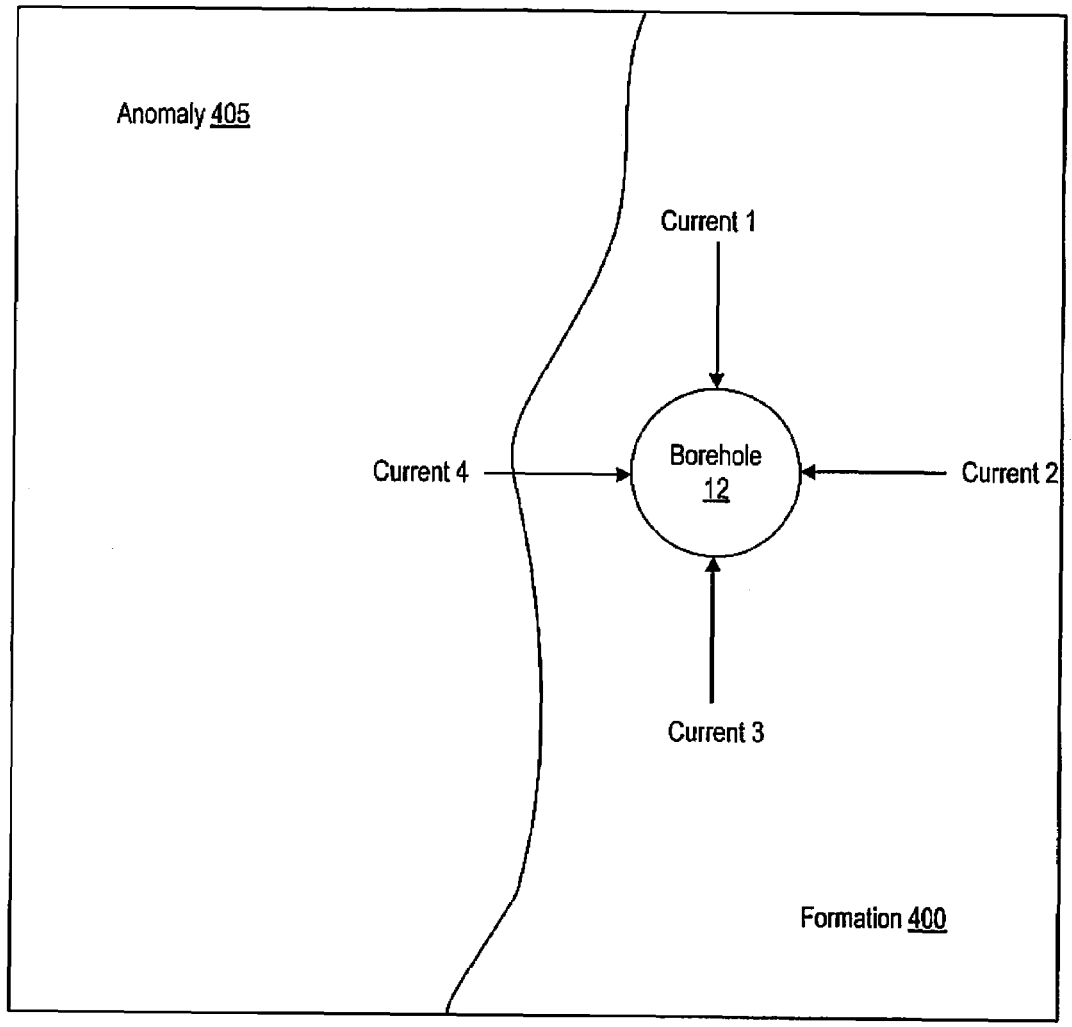
FIG. 4 is a cross-sectional view of the MWD tool passing through a formation containing an anomaly, according to one embodiment of the present invention.

FIG. 4 shows a cross-sectional view of the MWD tool passing through a formation containing an anomaly. In this example, borehole 12 (which contains the MWD tool) is passing through formation 400. An anomaly 405 within the formation is in close proximity to borehole 12 and has a boundary that is substantially parallel to the borehole axis.

In FIG. 4, the MWD tool is injecting current into formation 400, and the returned current is detected at each of four sensors. As shown, one sensor detects current 1, a second sensor detects current 2, a third sensor detects current 3, and a fourth sensor detects current 4. If anomaly 405 is more conductive than formation 400, current 4 should be the greatest current (of currents 1-4), and current 2 should be the minimum current. If instead anomaly is less conductive than formation 400, current 4 should be the smallest current (again, of currents 1-4), and current 1 should be the maximum current.

Returning to FIG. 3, once calculation module 212 has identified $A_{min}$ and $A_{max}$, the current values received at the other sensors (i.e., the sensors that are not $A_{min}$ nor $A_{max}$) can be averaged to produce an average current value $I_{avg}$. The ratios of the differences between the maximum and minimum currents and the average current can then be used to determine whether the anomaly is more or less conductive than the surrounding formation according to the following observation:

$$\frac{I_{max} - I_{avg}}{I_{avg} - I_{min}} \text{(for conductive anomaly)} \gg \frac{I_{max} - I_{avg}}{I_{avg} - I_{min}} \text{(for resistive anomaly)}.$$

In other words, the sensor nearest a conductive anomaly receives a far greater percentage of the total current than does the sensor farthest from a resistive anomaly. Therefore, the conductive and resistive anomaly cases can be distinguished, based upon the magnitude of the ratio of the measured sensor currents. The particular range of magnitudes to assign to conductive or resistive anomalies can be determined by performing computer simulations of the particular MWD tool being used, and this range may vary among different MWD tools.

It is noted that in some situations, the current values may not provide enough information to definitely determine whether the anomaly is more or less conductive than the surrounding formation (e.g., if the anomaly is oriented directly between two sensors). In this situation, historical information, such as that stored in history log 312, can be used to decide whether the anomaly is more or less conductive.

As noted briefly above, azimuthal angle calculation module 320 can calculate the azimuthal angle $\theta_A$ by calculating the arctangent of the difference in resistivity or conductivity at each sensor of a pair of sensors (e.g., pair 1 includes sensors A1 and A3, and pair 2 includes sensors A2 and A4). In an embodiment in which the MWD tool has four sensors, azimuthal angle calculation module 320 can calculate the azimuthal angle $\theta_A$ using the following formulas. If the anomaly is more conductive than the surrounding formation, the azimuthal angle can be computed from the apparent conductivity values, as shown in the following formula:

$$\theta_A = \operatorname{atan}\left(\frac{\sigma_{A1} - \sigma_{A3}}{\sigma_{A2} - \sigma_{A4}}\right).$$

If instead the anomaly is more resistive than the surrounding formation, azimuthal angle calculation module 320 can calculate the azimuthal angle using either the apparent resistivity values $\rho_{A1}$-$\rho_{A4}$ or the apparent conductivity values:

$$\theta_A = \operatorname{atan}\left(\frac{\rho_{A1} - \rho_{A3}}{\rho_{A2} - \rho_{A4}}\right) = \operatorname{atan}\left(\frac{\frac{1}{\sigma_{A1}} - \frac{1}{\sigma_{A3}}}{\frac{1}{\sigma_{A2}} - \frac{1}{\sigma_{A4}}}\right).$$

The azimuthal angle calculated by the above formulas is calculated relative to a known point (i.e., the azimuthal angle is not calculated relative to whichever sensor is currently closest to or furthest from the anomaly). Accordingly, the resulting azimuthal angle describes the location of the anomaly relative to a known point (e.g., the location of one of the sensors). For example, if the azimuthal angle is calculated relative to the position of sensor A1, an azimuthal angle of 0° indicates that the anomaly is located closest to sensor A1.

The output from a directional sensor included in and/or coupled to the MWD tool can then be used to determine the relationship between that known point and a standard directional vector, such as magnetic north or the gravity vector. The output from the directional sensor can thus be provided to azimuthal angle calculation module 320, which can use his information then allows azimuthal angle calculation module to calculate a relative azimuthal angle describing the location of the anomaly relative to the standard directional vector. This relative azimuthal angle can be provided to graphics module 330, as described in more detail below.

Formation property calculation module 322 calculates the magnitude of the conductivity $\sigma_A$ of the anomaly. Together, the magnitude calculated by formation property calculation module 322 and the angle calculated by azimuthal angle calculation module 320 define a vector quantity. It is noted that instead of (or in addition to) calculating conductivity of the anomaly, formation property calculation module 322 can calculate resistivity of the anomaly.

Formation property calculation module 322 is configured to calculate the conductivity $\sigma_A$ based upon the ratio, $I_{near-to-far}$, of current received at the sensor nearest to the anomaly to current received at the sensor farthest from the anomaly. Formation property calculation module 322 also uses the azimuthal angle $\theta_A$ calculated by azimuthal angle calculation module 322, to obtain $\sigma_A$.

To be able to calculate $I_{near-to-far}$, formation property calculation module 322 first identifies which of the sensors is nearest the anomaly. This sensor will be the near sensor, and the other sensor included in the same pair as the near sensor will be the far sensor. The azimuthal angle $\theta_A$, which (as described above) is directly computed from the apparent conductivities at each of the sensors by azimuthal angle calculation module 320, can be used to identify which sensor is nearest the anomaly, since this angle is calculated relative to a fixed point on the MWD tool. Accordingly, formation property calculation module 322 can receive information specifying azimuthal angle $\theta_A$ from azimuthal angle calculation module 320 and use that information to identify the near and far sensors. If two of the sensors are equidistant from the anomaly (e.g., if $\theta_A$=45°, 135°, 225°, or 315°), either of the two closest sensors may be designated as the near sensor, and the corresponding opposite sensor can be designated as the far sensor.

Once the near and far sensors have been identified, formation property calculation module 322 can calculate the ratio $I_{near-to-far}$ of current at the near sensor to current at the far sensor. The calculation uses the current values received by conductivity values calculation module 302 (alternatively, conductivity values calculation module 302 can calculate $I_{near-to-far}$ and provide $I_{near-to-far}$ to formation property calculation module 322).

Formation property calculation module 322 then uses the information in lookup table 314 to calculate $\sigma_a$ and a distance between the anomaly and the borehole. In one embodiment, the information in lookup table 314 is generated by simulating the MWD tool's response using a finite element computer model. For example, a three-dimensional finite element code model can be used to determine the response of a particular MWD tool to an anomaly that has a contrasting rock resistivity relative to the surrounding formation and that has a plane boundary parallel to the axis of the MWD tool. During modeling, the plane boundary is placed at different distances and azimuthal angles relative to the MWD tool. The resistivity (or conductivity) contrast between the anomaly and the surrounding formation is also altered. While these values are being varied, the voltages and currents associated with each sensor on the tool are computed. The results of the modeling correlate a particular azimuthal angle and $I_{near-to-far}$ with one or more resistivities (or conductivities) as well as one or more distances (here, each distance is the distance between the boundary of the anomaly and the borehole).

Accordingly, formation property calculation module 322 can provide the azimuthal angle and near-to-far current ratio to lookup table 314 and obtain one or more corresponding distances and one or more corresponding formation property (e.g., resistivity or conductivity) magnitudes. In one embodiment, each lookup will return one or more distance and magnitude pairs, as described in more detail below. In some situations, an exact match may not be found in lookup table 314, and thus formation property calculation module 322 may need to interpolate between the values in two adjacent entries of lookup table 314. Alternatively, the information stored in lookup table 314 can be represented by a set of mathematical functions, and formation property calculation module 322 can use curve-fitting techniques to obtain the magnitude and distance values based upon those functions.

It is noted that due to ambiguities, several magnitude and distance pairs can correspond to the same near-to-far current ratio and azimuthal angle pair. For example, the same near-to-far current ratio and azimuthal angle pair can correspond to both a more conductive anomaly located further from the MWD tool and a less conductive anomaly located closer to the MWD tool. Absent additional information to determine which of these potential anomaly characteristic pairs is the correct characteristic pair, the MWD tool can simply provide all possible characteristic pairs and graphics module 330 can display each possible characteristic of the anomaly to an operator.

As an example of how the information in lookup table 314 can be calculated and used, in one embodiment, finite element simulations can be performed for three different azimuthal angles, eight different values of anomaly resistivity, and 12 different anomaly-to-borehole distances, resulting in a total of 288 simulation scenarios. The resulting information can be saved to lookup table 314 as a sequence of 288 near-to-far current ratios, and these ratios can be arranged in three main groups. The first group of 96 values corresponds to simulations in which the azimuthal angle is 0°, the next 96 values correspond to simulations in which the azimuthal angle is 22.5°, and the final 96 values correspond to simulations in which the azimuthal angle is 45°. Each group of 96 includes eight subgroups. Each subgroup corresponds to one of the eight resistivity values, and these subgroups can be arranged in increasing order of resistivity. The 12 values in each subgroup correspond to the 12 anomaly-to-borehole distances for which the simulations were performed, arranged in order of increasing distance.

To use this information, formation property calculation module 322 first selects two of the three azimuthal angles for which the finite element model was solved. The two angles are selected such that the range bounded by the two angles contains the azimuthal angle calculated by azimuthal angle calculation module 320. For example, if the azimuthal angle is 15°, formation property calculation module 322 can select $\theta_1=0°$ and $\theta_2=22.5°$. Formation property calculation module 322 can then obtain information identifying a set of distances and corresponding near-to-far current ratios for each of the selected angles from lookup table 314.

Since the selected angles are not equal to the calculated azimuthal angle, formation property calculation module 322 can then use interpolation to generate an interpolated set of distances and corresponding near-to-far current ratios, based upon the set of information obtained from lookup table 314. For example, assume that lookup table 314 indicates that for $\theta_1=0°$ and $\theta_2=22.5°$, the following distances correlate to the near-to-far current ratios listed in the same column, for an anomaly having a resistivity of 0.2 Ω-m:

| | distance | | | |
|---|---|---|---|---|
| | 0.0830 m | 0.1016 m | 0.1524 m | 0.2032 m |
| near-to-far ratio (0°) | 27.571788 | 5.836751 | 2.653185 | 1.975069 |
| near-to-far ratio (22.5°) | 22.758449 | 5.054004 | 2.437898 | 1.876372 |

Based upon this information, formation property calculation module 322 can calculate an array of near-to-far current values versus distance for the measured azimuthal angle of 15° by interpolating between the corresponding points in the two arrays of finite element data corresponding to $\theta_1=0°$ and $\theta_2=22.5°$.

| | distance | | | |
|---|---|---|---|---|
| | 0.0830 m | 0.1016 m | 0.1524 m | 0.2032 m |
| near-to-far ratio (15°) | 24.362895 | 5.314919 | 2.509660 | 1.909271 |

Now, formation property calculation module 322 can use the interpolated data along with the near-to-far current ratio to obtain an estimate of the distance to a 0.2 Ω-m anomaly. If an exact match for the calculated near-to-far current ratio is not present in the lookup table, formation property calculation module 322 can select two values of the near-to-far ratio from the interpolated data, such that the selected values define a range that includes the measured near-to-far current ratio. For example, if the measured near-to-far current ratio is 3.0, formation property calculation module 322 can select near-to-far ratio values 5.314919 and 2.509660, which correspond to distances of 0.1016 meters and 0.1524 meters, respectively. Interpolating between the corresponding distance values, formation property calculation module 322 obtains a distance estimate of 0.143521 meters, or about 5.65". Accordingly, based on the information obtained from lookup table 314, the near-to-far current ratio (3.0 in this example) and azimuthal angle measured by the MWD tool is consistent with a 0.2 Ω-m parallel bed at a distance of 5.65".

As mentioned above, multiple distance and magnitude pairs can correspond to the same near-to-far current ratio and azimuthal angle. Thus, formation property calculation module 322 can repeat the process described above for one or more other anomaly resistivity values specified in lookup table 314. Each magnitude and distance pair obtained by formation property calculation module 322 can be provided to graphics module 330.

Thus, as the above example shows, formation property calculation module 322 can use information (such as the information stored in lookup table 314 of FIG. 3) generated by modeling to identify one or more distances and one or more resistivities or conductivities (or other magnitudes of formation characteristics) of the anomaly, based upon the current ratio $I_{near-to-far}$ and azimuthal angle $\theta_A$. If needed, formation property calculation module 322 can interpolate between known values to obtain these distances and magnitudes.

Graphics module 330 is configured to receive values calculated by conductivity values calculation module 302, azimuthal angle calculation module 320, and formation property calculation module 322. Based upon these values, graphics module 330 is configured to generate information to be displayed to a user on display device 340. In some embodiments, this information is primarily textual.

In other embodiments, graphics module 330 is configured to generate one or more graphics that represent one or more of the quantities received from the other modules. For example, in one embodiment, graphics module 330 is configured to generate a polar display that includes graphical content representing the anomaly that is being characterized by the values provided to graphics module 330. The graphical content can be displayed upon a polar display, in which the center of the polar display corresponds to a location of a borehole in which the MWD tool is located.

In such an embodiment, graphics module 330 can be configured to generate information defining one or more regions, each of which represents a possible position of the anomaly relative to the borehole and magnitude (in terms of conductivity, resistivity, or another formation characteristic) of the anomaly. The different regions can be distinguished by using different colors and/or shading patterns to fill and/or outline each region.

As noted above, lookup table 314 can provide one or more magnitudes and distances to formation property calculation module 322. A region can be generated for each magnitude and distance pair, and thus multiple regions can be displayed on the polar display. The number of regions to display will depend upon the distance between each region and the borehole and the resolution of the polar display.

In one embodiment, graphics module 330 generates the boundary of each region by identifying a tangent line. The tangent line is calculated based upon the azimuthal angle and the distance component of the magnitude and distance pair to be represented by that region. The tangent line intersects a circle (centered at the center of the polar display) that has a radius equal to the distance component. This tangent line can then be used as the boundary of the region. Specific equations that graphics module 330 can implement to generate the tangent line are described below with respect to FIG. 5, which illustrates graphical content that can be generated by graphics module 330.

The magnitude component of the magnitude and distance pair to be represented by that region is used to determine how to shade that region. For example, a key or legend that correlates different conductivities or resistivities to particular color and/or shading schemes can be displayed as part of the graphic. Based upon the magnitude that corresponds to a particular region, graphics module 330 can select the appropriate color and/or shading scheme and fill the region with the selected color and/or shading scheme.

While specific equations have been described in the above description of FIG. 3, it is noted that other embodiments can implement different equations. For example, a MWD tool having six sensors will use different equations than those presented above, which are designed for use with a MWD tool having four sensors. Similarly, in alternative embodiments, graphics module 330 can use different equations to calculate the boundaries of the regions to be displayed.

While FIG. 3 shows a particular set of modules as being part of calculation module 212, it is noted that at least some of this functionality (e.g., such as the functionality implemented by graphics module 330) can alternatively be implemented outside of the MWD tool. For example, in one alternative embodiment, calculation module 212 can include only conductivity values calculation module 302, while a surface device (e.g., a surface computer system) can implement the other functionality shown in FIG. 3. In particular, the surface device can implement (e.g., in software executing on a computing device) azimuthal angle calculation module 320, formation property calculation module 322, graphics module 330, history log 312, and lookup table 314. The MWD tool can communicate the conductivity values generated by conductivity values calculation module 302 to the surface device, which can then operate as described above.

As another alternative, the MWD tool can calculate the individual apparent conductivity (or resistivity) values and provide the values to a surface device, which can then calculate background conductivity $\sigma_{AB}$, near-to-far current ratio $I_{near-to-far}$, azimuthal angle $\theta_A$, and anomaly conductivity $\sigma_A$ and distance.

As yet another alternative, the surface device can implement graphics module 330 instead of calculation module 212. Thus, the MWD tool can provide the values generated by conductivity values calculation module 302, azimuthal angle calculation module 320, and formation property calculation module 322 to the surface device, which can then input the values to graphics module 330. Many other alternative implementations, which can subdivide the functionality shown in FIG. 3 between the MWD tool and a surface computing device in a variety of different ways, are also possible.

Figure 5:
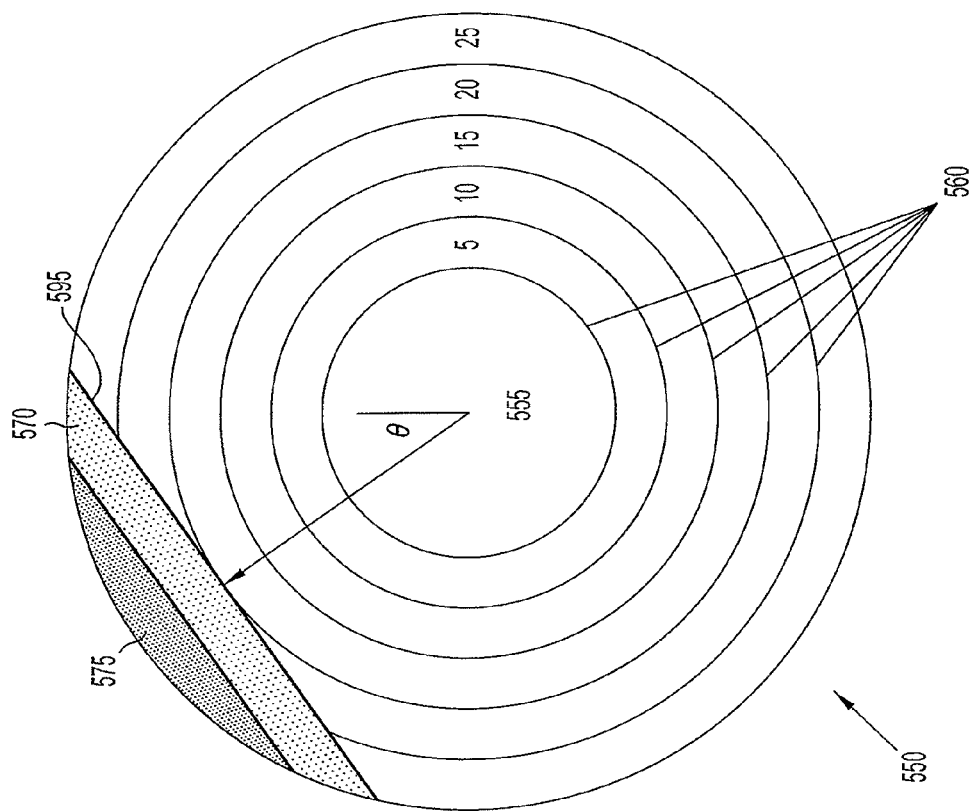
FIG. 5 is a block diagram of a polar display generated by and/or using information provided by the MWD tool, according to one embodiment of the present invention.
Figure 5:
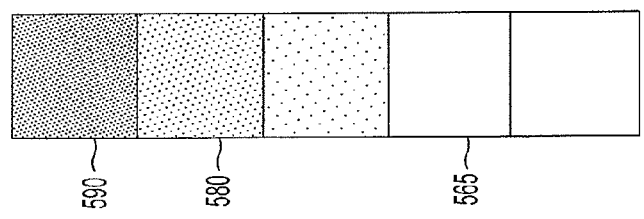

FIG. 5 is a block diagram of a polar display generated by and/or using information provided by the MWD tool. FIG. 5 illustrates how graphical content (e.g., as generated by graphics module 330 of FIG. 3) can be displayed on a polar display 550. In this example, various resistivity values are associated with different shades of grey, as shown in a key 500. In key 500, darker shades of grey (towards the top of the key) represent regions of increasing resistivity.

Polar display 550 includes a center portion 555, which represents the borehole. Polar display 550 also includes several concentric rings 560, which represent various distances, labeled 5, 10, 15, 20, and 25 (e.g., specifying distance in meters, feet, or inches), from the borehole.

The majority of the display is shaded with shade 565. This pattern represents the resistivity of the formation through which the borehole is currently passing (e.g., this resistivity can be determined by taking the inverse of the background conductivity generated by conductivity values calculation module 302 of FIG. 3).

Two regions 570 and 575 of different resistivity are also shown on the display. Region 570 is shaded using shade 580 and region 575 is shaded using shade 585. Each of these regions is shown as being located at a different radial distance from the center of the polar display. The angular direction of the regions indicates the direction of the anomaly relative to magnetic north (when drilling a substantially vertical well) or the gravity vector (when drilling a substantially horizontal well). Each region 570 and 575 can correspond to a magnitude and distance pair calculated by formation property calculation module 322 of FIG. 3. Thus, both regions represent possible characteristics of the anomaly.

Based upon the polar display, an operator is able to determine the direction and proximity of an adjacent anomaly. As noted above, there may be several potential ways to characterize the anomaly (using multiple magnitude and distance pairs, as described above), since the MWD tool can respond in the same way to highly conductive bed at a greater distance as to a less conductive bed at close proximity. Thus, multiple possible characterizations of the anomaly can be displayed on the polar display, as indicated by the two regions displayed in FIG. 5.

In some embodiments, information about the anomalies already encountered by the borehole can be stored as part of the logging history. The graphics module can access this logging history and, in some situations, use the logging history to select fewer than all of the regions to display (e.g., if the logging history indicates that the anomaly has a particular resistivity, only the region having that resistivity needs to be displayed).

To generate regions such as 570 and 575 for display on a polar display, a graphics module (e.g., such as graphics module 330 of FIG. 3) can calculate a tangent line. For a given region, the tangent line will identify the boundary of that region that is closest to the center of the polar display. Line 595 is an example of a tangent line for region 570.

The tangent line intercepts one of the concentric circles at a point having coordinates $x = -R \cdot \sin\theta$, $y = R \cdot \cos\theta$, where R is the distance associated with the region and θ is the relative azimuthal angle associated with the anomaly. The tangent line also intersects the y-axis of the polar display at a point where x=0, y=R/cos θ. Accordingly, the equation of the tangent line is:

$$y = \frac{R - x \cdot \sin\theta}{\cos\theta}.$$

Since only a portion of the tangent line will be displayed, the graphics module can truncate the tangent line, such that:

$$x^2 + y^2 \leq R^2.$$

Thus, a graphics module can calculate a tangent line that defines the boundary of a region corresponding to a particular possible characteristic (as defined by a magnitude distance pair) of an anomaly. If there is room on the display to show multiple such regions, additional tangent lines can be calculated and used to define the boundaries of the other regions.

Figure 6:
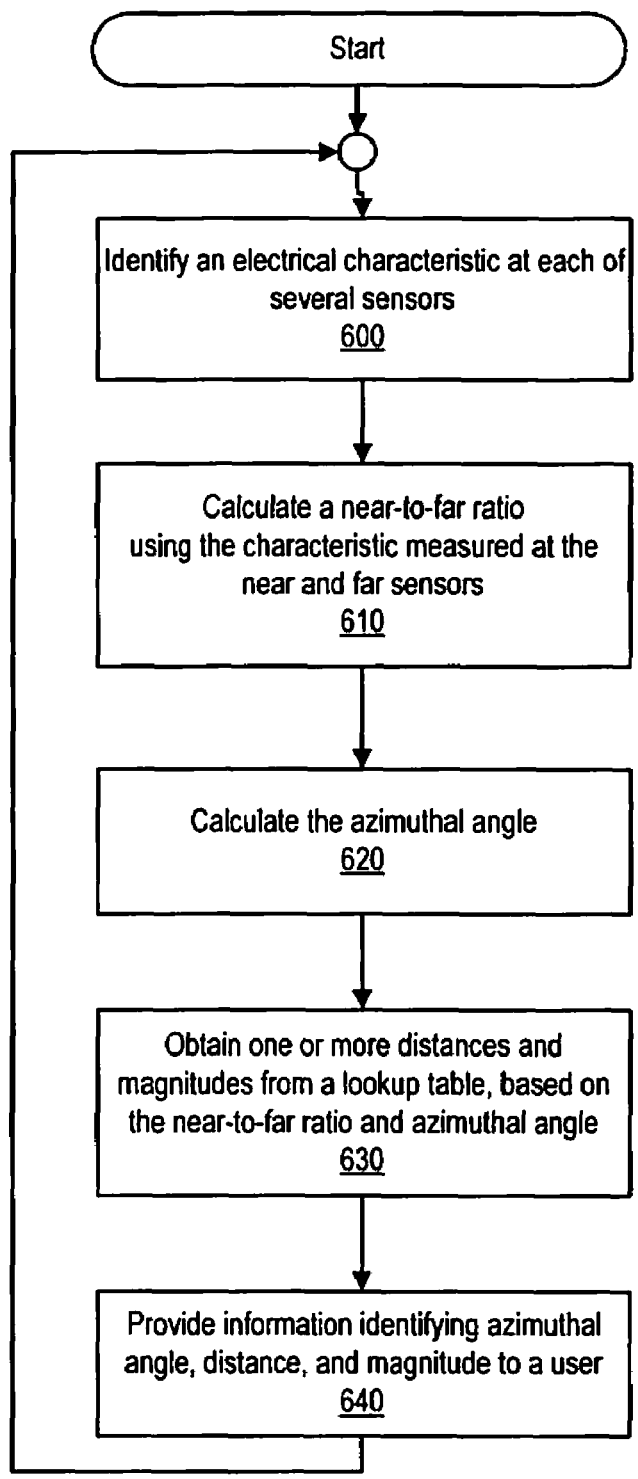
FIG. 6 is a flowchart of a method of calculating information describing a formation property, according to one embodiment of the present invention.

FIG. 6 is a flowchart of a method of calculating information describing a formation property. This method can be performed by a MWD tool and/or a surface computing device, as described above. In one embodiment, operation 600 is performed by a MWD tool and operations 610, 620, 630, and 640 are performed by a surface computing device. In other embodiments, operations 600, 610, 620, and 630 are performed by a MWD tool and operation 640 is performed by a surface computing device.

The method begins at 600, when the MWD tool identifies an electrical characteristic (e.g., current and/or voltage) at each of several sensors included as part of the MWD tool. Based upon the identified characteristics, a near-to-far ratio is calculated, which indicates the ratio of the electrical characteristic detected at the sensor nearest to an anomaly relative to the electrical characteristic detected at the sensor furthest from the anomaly, as shown at 610. Techniques for identifying the near and far sensors are described above in the description of FIG. 3.

At 620, an azimuthal angle is calculated, based upon the electrical characteristics detected at the sensors. The azimuthal angle can be calculated, for example, by determining the apparent conductivity of a formation at each of the sensors, using the individual electrical characteristic identified by each of the sensors, and then using the apparent conductivities to calculate the azimuthal angle.

At 630, one or more distances and magnitudes are obtained from a lookup table, based upon the near-to-far ratio and the azimuthal angle. Information identifying the azimuthal angle, distance, and magnitude can then be provided to a user, as shown at 640. This information can be provided in the form of a graphical display.

Figure 7:
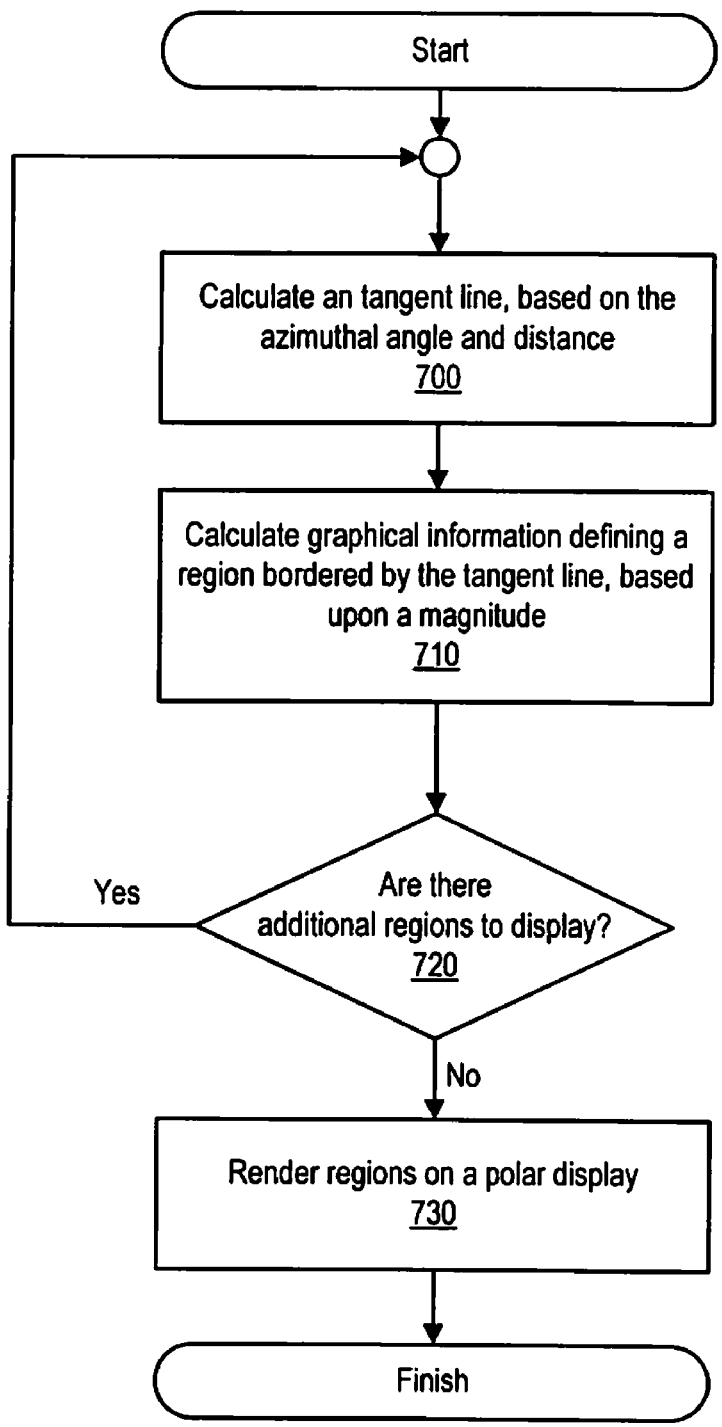
FIG. 7 is a flowchart of a method of generating a display, according to one embodiment of the present invention.

FIG. 7 is a flowchart of a method of generating such a display. This method can be performed by a graphics module (e.g., graphics module 330 of FIG. 3). The method begins at 700, when the graphics module calculates a tangent line, based upon the azimuthal angle and distance calculated in FIG. 6.

The graphics module then calculates graphical information defining a region that is bordered by the tangent line, as shown at 710. This graphical information can be based upon the tangent line as well as the magnitude calculated in FIG. 6. The graphical information can include information specifying the location of the region on a polar display (e.g., such that the region is bounded by the tangent line) as well as a type of shading (e.g., in terms of color and/or pattern) with which to fill the region (e.g., the shading can indicate the magnitude of the electrical characteristic to which the region corresponds).

If there are more regions to be displayed, as determined at 720, operations 700 and 710 can be repeated for each additional region. Once all of the graphical information for each region has been calculated, the regions are rendered on a polar display, as shown at 730.

Figure 8:
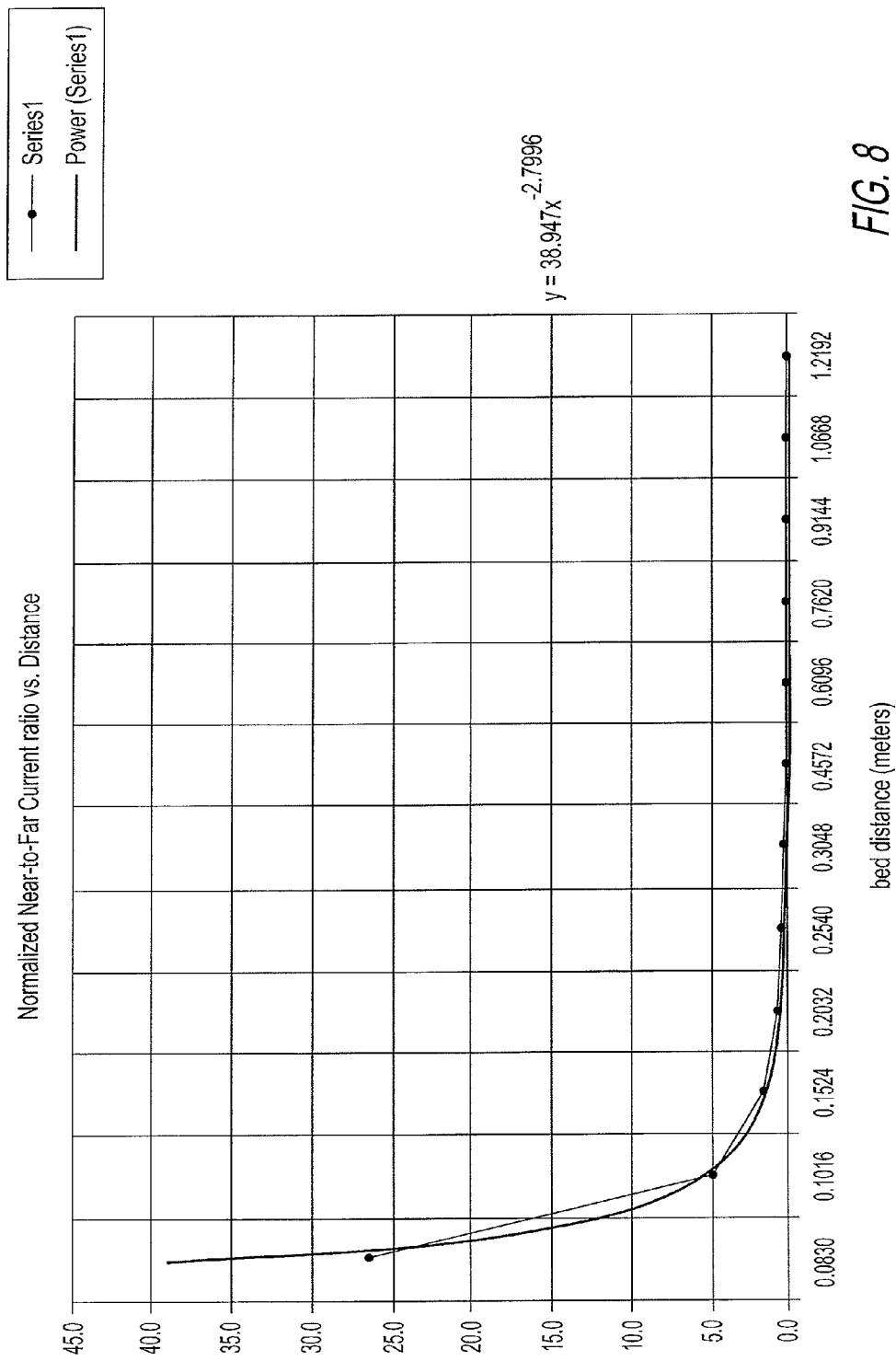
FIG. 8 is a graph that shows the relationship between the distance to the boundary of a parallel anomaly and the resistivity contrast detected by a MWD tool, according to one embodiment of the present invention.

FIG. 8 is a simplified graph that shows the relationship between the distance to the boundary of a parallel anomaly and the resistivity contrast detected by the MWD tool. It is noted that the data used to generate a graph can be obtained by performing a computer simulation of a model of the MWD tool, as noted above in the discussion of FIG. 3.

The graph of FIG. 8 suggests a simple inverse-square-law relation between a normalized current difference $I_{norm}$ (defined below) and the distance from the boundary. In FIG. 8, the normalized current ratio is plotted against the bed distance, along with a computed inverse-power-law curvefit, showing the close correlation between the two curves.

Finite element modeling of (or other simulation of) a MWD tool can predict the current distribution, as sensed by the MWD tool, that will arise from a given formation-anomaly combination, based on the specific geometric relationship and electrical characteristics of the formation and the anomaly. As discussed above, one type of anomaly is a parallel bed (a planar region parallel to the borehole), which can have a resistivity that is markedly higher or lower than that of the adjacent formation. As previously discussed, if the resistivity of a parallel bed is lower than that of the formation, then the sensor nearest the parallel bed will receive more current than the sensor on the opposite side of the MWD tool (i.e., the sensor farthest from the parallel bed). On the other hand, if the resistivity of the parallel bed is higher than that of the formation, the exact opposite holds, such that the nearest sensor receives less current than the sensor farthest from the bed.

Additionally, a further observation can be made regarding the relationship between the "normalized" near-to-far current ratio $I_{norm}$ and the distance to the parallel bed. The normalized near-to-far current ratio (for a conductive parallel bed) as follows:

$$I_{norm} = \frac{I_{near} - I_{far}}{I_{far}}.$$

As shown in FIG. 8, this ratio closely follows a simple inverse-power-law relationship as a function of the distance from the borehole to the conductive parallel bed. This can be seen in the graph, which plots $I_{norm}$ versus distance for a resistivity contrast of $\rho_{contrast}$=0.0002, and typical of $\rho_{contrast}$<1.0).

Returning to FIG. 3, it is noted that all or some of the modules 212, 302, 320, 322, and 330 shown in FIG. 3 can be implemented in software executing on a computing device (e.g., a personal computer, server, personal digital assistant, cell phone, laptop, workstation, or the like). In particular, such a computing device includes one or more processors (e.g., microprocessors, PLDs (Programmable Logic Devices), or ASICs (Application Specific Integrated Circuits)) configured to execute program instructions stored in a memory (e.g., such as memory 310 of FIG. 3). Such a memory can include various types of RAM (Random Access Memory), ROM (Read Only Memory), Flash memory, MEMS (Micro Electro-Mechanical Systems) memory, and the like. The computing device can also include one or more interfaces (e.g., such as network interfaces, one or more interfaces to storage devices, and/or one or more interfaces to an input/output (I/O) device such as a keyboard, digital tablet, mouse, monitor, or the like), which can each be coupled (e.g., by a bus or other interconnect) to the processor(s) and memory.

It is noted that the program instructions and data (e.g., such as history log 312 and/or lookup table 314) implementing all or part of calculation module 212 can be stored on various computer readable media such as memory 310. In some embodiments, such program instructions can be stored on a computer readable storage medium such as a CD (Compact Disc), DVD (Digital Versatile Disc), hard disk, optical disk, tape device, floppy disk, and the like. In order to be executed by a processor, the instructions and data are loaded into memory from the other computer readable storage medium. The instructions and/or data can also be transferred to a computing device for storage in memory via a network such as the Internet or upon a carrier medium.

Although the present invention has been described in connection with several embodiments, the invention is not intended to be limited to the specific forms set forth herein. On the contrary, the present invention is intended to cover such alternatives, modifications, and equivalents as can be reasonably included within the scope of the invention as defined by the appended claims.

What is claimed is:

1. A method comprising:
   identifying an electrical characteristic at each of a plurality of sensors,
      wherein the plurality of sensors comprises a first sensor, and
      wherein a measurement-while-drilling (MWD) tool comprises the plurality of sensors;
   generating information identifying a formation property of an anomaly within a geologic formation, based upon the electrical characteristic,
      wherein the formation property is identified by at least one magnitude and at least one distance, and
      wherein the formation property is identified relative to a corresponding property of the geologic formation; and
   generating information identifying an azimuthal angle, based upon the electrical characteristic,
      wherein the azimuthal angle relates a position of the anomalous formation to a position of the first sensor.

2. The method of claim 1, wherein the formation property is a conductivity or resistivity of the anomaly.

3. The method of claim 2, further comprising determining whether the anomaly is more conductive or less conductive than the geologic formation.

4. The method of claim 3, wherein said determining comprises accessing information indicating historical conductivity or resistivity detected by the MWD tool.

5. The method of claim 3, wherein said determining comprises identifying which of the plurality of sensors is receiving a greatest or smallest amount of current.

6. The method of claim 3, wherein if the anomaly is more conductive than the geologic formation, said generating the information identifying the azimuthal angle comprises:
   generating a conductivity value for each of the plurality of sensors;
   computing a first difference between conductivity values associated with a first pair of sensors on opposing sides of the MWD tool;
   computing a second difference between conductivity values associated with a second pair of sensors on opposing sides of the MWD tool; and
   calculating an arctangent of a ratio of the first difference to the second difference.

7. The method of claim 3, wherein if the anomaly is less conductive than the geologic formation, said generating the information identifying the azimuthal angle comprises:
   generating a resistivity value for each of the plurality of sensors;
   computing a first difference between resistivity values associated with a first pair of sensors on opposing sides of the MWD tool;
   computing a second difference between resistivity values associated with a second pair of sensors on opposing sides of the MWD tool; and
   calculating an arctangent of a ratio of the first difference to the second difference.

8. The method of claim 2, wherein said generating the information identifying the conductivity of the anomaly comprises:
   calculating a ratio of a near current to a far current,
      wherein the near current is received by a closest sensor of the plurality of sensors,
      wherein the far current is received by a furthest sensor of the plurality of sensors,
      wherein the closest sensor is closest to the anomaly, and
      wherein the furthest sensor is farthest from the anomaly; and
   looking up the at least one magnitude and the at least one distance in a lookup table, based upon the ratio.

9. The method of claim 1, further comprising calculating a relative angle, based upon the azimuthal angle and a known angle between the first sensor and one of: magnetic north and the gravity vector.

10. The method of claim 1, further comprising:
    generating a graphic, based upon the at least one magnitude and the at least one distance and the azimuthal angle; and
    displaying the graphic on a polar display,
       wherein a center of the polar display corresponds to a location of the borehole in which the MWD tool is located.

11. The method of claim 10,
    wherein the graphic comprises one or more regions,
    wherein each region represents a portion of the geologic formation having a different conductivity or resistivity, and
    wherein each of the regions corresponds to a respective one of one or more magnitude and distance pairs.

12. The method of claim 10, wherein the generating the display comprises:
    identifying a tangent line based upon the azimuthal angle,
       wherein the tangent line intersects a circle having a radius equal to a first distance of the at least one distance; and
    marking a first band on the polar display, wherein the first band is bounded by the tangent line.

13. A system comprising:
    a calculation module configured to receive information identifying an electrical characteristic detected at each of a plurality of sensors,
       wherein a measurement-while-drilling (MWD) tool comprises the plurality of sensors,
       wherein the plurality of sensors comprises a first sensor,
       wherein the calculation module is configured to generate, based upon the electrical characteristic, information identifying an azimuthal angle and information identifying a formation property of an anomaly within a geologic formation, wherein the formation property is identified by at least one magnitude and at least one distance, wherein the formation property is identified relative to a corresponding property of the geologic formation, and wherein the azimuthal angle relates a position of the anomalous formation to a position of the first sensor.

14. The system of claim 13, wherein the formation property is a conductivity or resistivity of the anomaly.

15. The system of claim 14, wherein the calculation module is configured to determine whether the anomaly is more conductive or less conductive than the geologic formation.

16. The system of claim 15, wherein the calculation module is configured to determine whether the anomaly is more conductive or less conductive than the geologic formation based upon information indicating historical conductivity or resistivity detected by the MWD tool.

17. The system of claim 15, wherein the calculation module is configured to determine whether the anomaly is more conductive or less conductive than the geologic formation based upon information identifying which of the plurality of sensors is receiving a greatest or smallest amount of current.

18. The system of claim 15, wherein the calculation module is configured to:

generate a value for each of the plurality of sensors, wherein the value identifies a conductivity or resistivity;

compute a first difference between values associated with a first pair of sensors on opposing sides of the MWD tool;

compute a second difference between values associated with a second pair of sensors on opposing sides of the MWD tool; and calculate an arctangent of a ratio of the first difference to the second difference, wherein the arctangent identifies the azimuthal angle.

19. The system of claim 14, wherein the calculation module is configured to:

calculate a ratio of a near current to a far current, wherein the near current is received by a closest sensor of the plurality of sensors, wherein the far current is received by a furthest sensor of the plurality of sensors, wherein the closest sensor is closest to the anomaly, and wherein the furthest sensor is farthest from the anomaly; and look up the at least one magnitude and the at least one distance in a lookup table, based upon the ratio.

20. The system of claim 13, wherein the calculation module is configured to calculate a relative angle, based upon the azimuthal angle and a known angle between the first sensor and one of: magnetic north and the gravity vector.

21. The system of claim 13, further comprising a graphics module configured to:

generate a graphic, based upon the at least one magnitude and the at least one distance and the azimuthal angle; and cause the graphic to be displayed on a polar display, wherein a center of the polar display corresponds to a location of a borehole in which the MWD tool is located.

22. The system of claim 21, wherein the graphic comprises one or more regions, wherein each region represents a portion of the geologic formation having a different conductivity, and wherein each of the regions corresponds to a respective one of one or more magnitude and distance pairs.

23. The system of claim 21, wherein the graphics module is configured to:

identify a tangent line based upon the azimuthal angle, wherein the tangent line intersects a circle having a radius equal to a first distance of the at least one distance; and display a first band on the polar display, wherein the first band is bounded by the tangent line.

24. The system of claim 13, further comprising a surface computing device coupled to receive information from the MWD tool, wherein the surface computing device comprises at least a portion of the calculation module.

25. The system of claim 13, further comprising the MWD tool, wherein the MWD tool comprises at least a portion of the calculation module.

26. A computer readable storage medium comprising program instructions executable to:

generate information identifying a formation property of an anomaly within a geologic formation, based upon an electrical characteristic identified at each of a plurality of sensors, wherein the plurality of sensors comprises a first sensor, and wherein a measurement-while-drilling (MWD) tool comprises the plurality of sensors;

wherein the formation property is identified by at least one magnitude and at least one distance, and wherein the formation property is identified relative to a corresponding property of the geologic formation; and generate information identifying an azimuthal angle, based upon the electrical characteristic, wherein the azimuthal angle relates a position of the anomalous formation to a position of the first sensor.

27. The computer readable storage medium of claim 26, wherein the formation property is a conductivity or resistivity of the anomaly.

28. The computer readable storage medium of claim 27, wherein the program instructions are further executable to determine whether the anomaly is more conductive or less conductive than the geologic formation.

29. The computer readable storage medium of claim 28, wherein the program instructions are executable to determine whether the anomaly is more conductive or less conductive than the geologic formation, based upon information indicating historical conductivity or resistivity detected by the MWD tool.

30. The computer readable storage medium of claim 28, wherein the program instructions are executable to determine whether the anomaly is more conductive or less conductive than the geologic formation, based upon information identifying which of the plurality of sensors is receiving a greatest or smallest amount of current.

31. The computer readable storage medium of claim 28, wherein the program instructions are executable to:

generate a value for each of the plurality of sensors, wherein the value identifies a conductivity or resistivity;

compute a first difference between values associated with a first pair of sensors on opposing sides of the MWD tool;

compute a second difference between values associated with a second pair of sensors on opposing sides of the MWD tool; and calculate an arctangent of a ratio of the first difference to the second difference, wherein the arctangent identifies the azimuthal angle.

32. The computer readable storage medium of claim 27, wherein the program instructions are executable to:
calculate a ratio of a near current to a far current,
wherein the near current is received by a closest sensor of the plurality of sensors,
wherein the far current is received by a furthest sensor of the plurality of sensors,
wherein the closest sensor is closest to the anomaly, and
wherein the furthest sensor is farthest from the anomaly; and
look up the at least one magnitude and the at least one distance in a lookup table, based upon the ratio.

33. The computer readable storage medium of claim 26, wherein the program instructions are executable to calculate a relative angle, based upon the azimuthal angle and a known angle between the first sensor and one of: magnetic north and the gravity vector.

34. The computer readable storage medium of claim 26, wherein the program instructions are executable to:
generate a graphic, based upon the at least one magnitude and the at least one distance and the azimuthal angle; and
display the graphic on a polar display,
wherein a center of the polar display corresponds to a location of a borehole in which the MWD tool is located.

35. The computer readable storage medium of claim 34, wherein the graphic comprises one or more regions,
wherein each region represents a portion of the geologic formation having a different conductivity or resistivity, and
wherein each of the regions corresponds to a respective one of one or more magnitude and distance pairs.

36. The computer readable storage medium of claim 34, the program instructions are executable to:
identify a tangent line based upon the azimuthal angle,
wherein the tangent line intersects a circle having a radius equal to a first distance of the at least one distance; and
mark a first band on the polar display, wherein the first band is bounded by the tangent line.

37. A system comprising:
means for generating information identifying a formation property of an anomaly within a geologic formation, based upon an electrical characteristic identified at each of a plurality of sensors,
wherein the plurality of sensors comprises a first sensor,
wherein a measurement-while-drilling (MWD) tool comprises the plurality of sensors;
wherein the formation property is identified by at least one magnitude and at least one distance, and
wherein the formation property is identified relative to a corresponding property of the geologic formation; and
means for generating information identifying an azimuthal angle, based upon the electrical characteristic,
wherein the azimuthal angle relates a position of the anomalous formation to a position of the first sensor.

* * * * *